(12) United States Patent
Conn et al.

(10) Patent No.: US 12,333,299 B2
(45) Date of Patent: Jun. 17, 2025

(54) SYSTEM AND METHOD FOR GRADUAL MIGRATION FROM A LEGACY APPLICATION TO A REPLACEMENT APPLICATION

(71) Applicant: MOTOROLA SOLUTIONS, INC., Chicago, IL (US)

(72) Inventors: Greg Conn, Vancouver (CA); Cody Yarbrough, Herring Cove (CA)

(73) Assignee: MOTOROLA SOLUTIONS INC., Chicago, IL (US)

(*) Notice: Subject to any disclaimer, the term of this patent is extended or adjusted under 35 U.S.C. 154(b) by 120 days.

(21) Appl. No.: 18/123,580

(22) Filed: Mar. 20, 2023

(65) Prior Publication Data

US 2024/0319988 A1 Sep. 26, 2024

(51) Int. Cl.
*G06F 9/44* (2018.01)
*G06F 8/65* (2018.01)
*G06F 8/71* (2018.01)

(52) U.S. Cl.
CPC . *G06F 8/71* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 5,410,703 A | 4/1995 | Nilsson et al. | |
| 5,828,897 A | 10/1998 | Kirsch et al. | |
| 8,005,788 B2 * | 8/2011 | Leroux | G06F 8/656 |
| | | | 717/168 |
| 10,606,573 B2 | 3/2020 | Apte et al. | |
| 10,664,186 B2 | 5/2020 | Makin et al. | |
| 10,713,037 B2 | 7/2020 | Reese et al. | |
| 11,112,975 B2 | 9/2021 | Green et al. | |
| 11,467,826 B1 * | 10/2022 | Chawda | G06F 9/547 |
| 2016/0306864 A1 * | 10/2016 | Estes, Jr. | G06F 16/27 |
| 2019/0187973 A1 * | 6/2019 | Weigert | G06F 11/3684 |
| 2023/0229508 A1 * | 7/2023 | Agarwal | G06F 9/5044 |
| | | | 718/104 |
| 2023/0401038 A1 * | 12/2023 | Rajagopalan | G06F 8/60 |

* cited by examiner

*Primary Examiner* — Bradley A Teets
*Assistant Examiner* — Lanny N Ung
(74) *Attorney, Agent, or Firm* — Daniel R Bestor

(57) ABSTRACT

A system and method for gradual migration from a legacy application to a replacement application is disclosed. The method includes determining whether or not a feature requested by a user is available amongst installed features currently deliverable by a replacement software application. When the feature requested by the user is currently deliverable by the replacement software application, a legacy software application communicates with the replacement software application to cause the feature requested by the user to be obtained from the replacement software application.

18 Claims, 4 Drawing Sheets

SYSTEM AND METHOD FOR GRADUAL MIGRATION FROM A LEGACY APPLICATION TO A REPLACEMENT APPLICATION

BACKGROUND

In light of the fast and increasing pace of modern software development, many firms and individuals face issues migrating from a legacy software application to another software application that is replacing the legacy software application. Users of computer systems may be hesitant to upgrade (e.g. as it relates the migration to the replacement software application). Also, the users may refuse to do so because of the management effort tasked to them. Thus, complications can build from these and other factors. Furthermore, bugs, software conflicts and similar issues with the replacement software application can compound frustrations experienced by the impacted customers. Clearly companies and other entities that are producing and providing the software are desirous of proactively minimizing the frustrations that may be experienced.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments.

Figure 1:
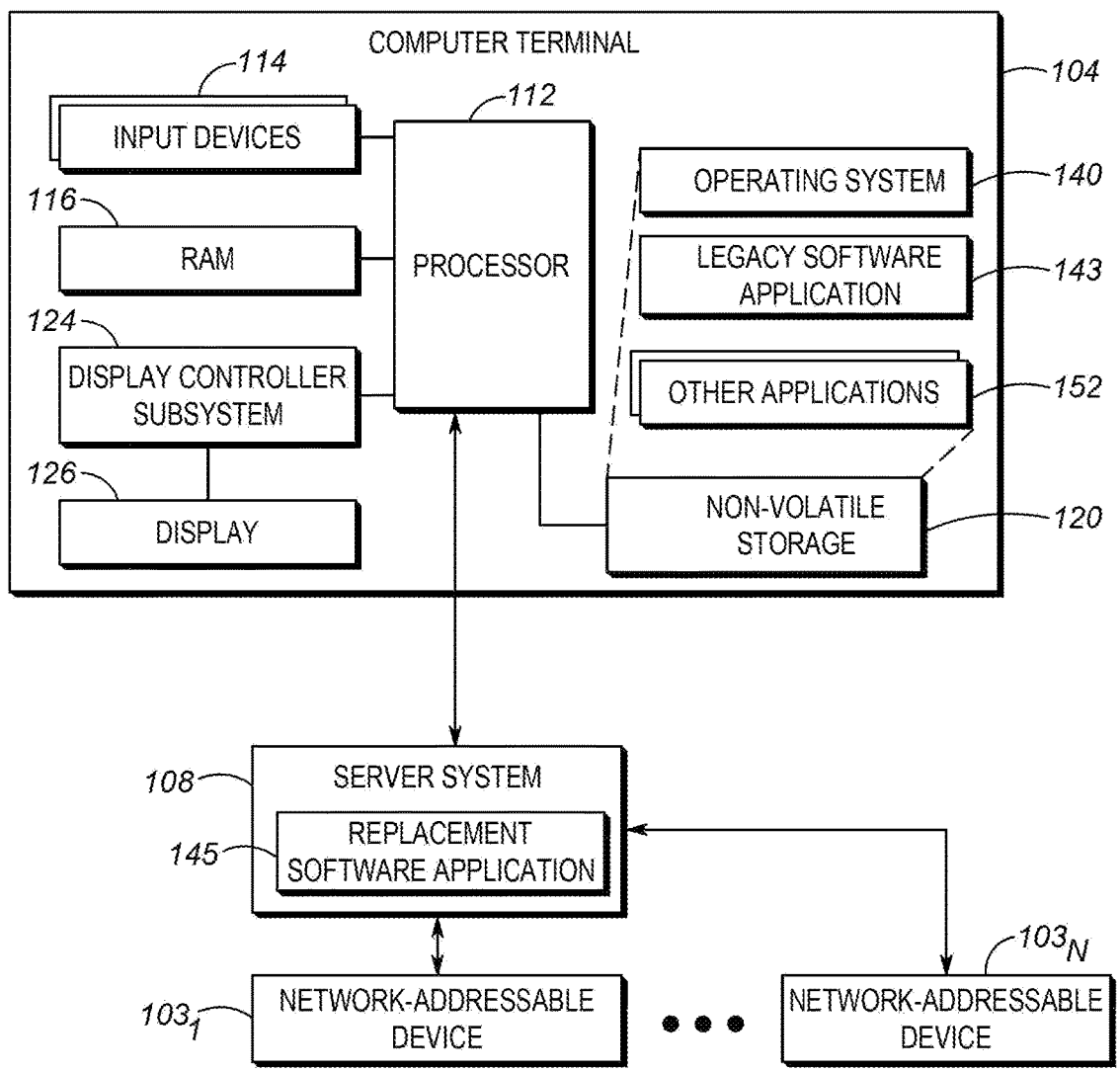
FIG. 1 is a block diagram of a computer system in accordance with example embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION OF THE INVENTION

According to one example embodiment, there is provided a computer system that includes at least one non-volatile computer readable medium storing a legacy software application and a replacement software application. Each of the legacy and replacement software applications are independently operable. The legacy software application is configured to communicate with the replacement software application, and the legacy software application includes a user interface layer that is configured to generate displayable content presentable to a user of the computer system. The legacy software application also includes a feature selector module that is configured to cause a user requested feature to be obtained from the replacement software application when included therein. When the user requested feature is not included in the replacement software application, the feature selector module is further configured to cause the user requested feature to instead be provided from the legacy software application via the user interface layer of the legacy software application.

According to another example embodiment, there is provided a computer-implemented method that includes generating a user interface through which displayable content is presentable to a user of a computer system. The computer-implemented method also includes receiving user input via the user interface. The user input includes a request to obtain a feature provided at least in part by execution of software. The computer-implemented method also includes determining whether or not the feature requested by the user is available amongst installed features currently deliverable by a replacement software application. When the feature requested by the user is currently deliverable by the replacement software application, a legacy software application communicates with the replacement software application to cause the feature requested by the user to be obtained from the replacement software application. When the feature requested by the user is not currently deliverable by the replacement software application, the feature requested by the user is provided from the legacy software application (that includes code, that corresponds to the feature, stored within the computer system).

Each of the above-mentioned embodiments will be discussed in more detail below, starting with example system and device architectures of the system in which the embodiments may be practiced, followed by an illustration of processing blocks for achieving an improved technical method, system and computer program product for gradually migrating from a legacy application to a replacement application. Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus that may be on or off-premises, or may be accessed via the cloud in any of a software as a service (Saas), platform as a service (PaaS), or infrastructure as a service (IaaS) architecture so as to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

Further advantages and features consistent with this disclosure will be set forth in the following detailed description, with reference to the figures.

Referring now to the drawings, and in particular FIG. 1 which is a block diagram of an example computer system 100 within which methods in accordance with example embodiments can be carried out. Included within the illustrated computer system 100 are network-addressable devices $103_1$ to $103_N$, one or more computer terminals/devices 104 and a server system 108. In some example embodiments, the computer terminal/device 104 is a personal computer system; however in other example embodiments the computer terminal 104 is a selected one or more of the following: a handheld device such as, for example, a tablet, a phablet, a smart phone or a personal digital assistant (PDA); a laptop computer; a smart television; and other suitable devices. With respect to the server system 108, this could comprise a single physical machine or multiple physical machines. It will be understood that the server system 108 need not be contained within a single chassis, nor necessarily will there be a single location for the server system 108. The illustrated server system 108 includes replacement software application 145 (a more detailed explanation of the replacement software application 145 is provided later herein).

As will be appreciated by those skilled in the art, at least some of the functionality of the server system 108 can be implemented within the computer terminal 104 rather than within the server system 108 (for instance, in some alternative examples, the replacement software application 145 may form a part of the computer terminal 104 instead of forming a part of the server system 108). In some examples, part or all of the server system 108 is provided within the computer system 100 by way of a cloud computing implementation.

The computer terminal 104 communicates with the server system 108 through one or more networks. These networks can include the Internet, or one or more other public/private networks coupled together by network switches or other communication elements. The network(s) could be of the form of, for example, client-server networks, peer-to-peer networks, etc. Data connections between the computer terminal 104 and the server system 108 can be any number of known arrangements for accessing a data communications network, such as, for example, dial-up Serial Line Interface Protocol/Point-to-Point Protocol (SLIP/PPP), Integrated Services Digital Network (ISDN), dedicated lease line service, broadband (e.g. cable) access, Digital Subscriber Line (DSL), Asynchronous Transfer Mode (ATM), Frame Relay, or other known access techniques (for example, radio frequency (RF) links). In at least one example embodiment, the computer terminal 104 and the server system 108 are within the same Local Area Network (LAN).

The computer terminal 104 includes at least one processor 112 that controls the overall operation of the computer terminal. The processor 112 interacts with various subsystems such as, for example, input devices 114 (such as a selected one or more of a keyboard, mouse, touch pad, roller ball and voice control means, for example), random access memory (RAM) 116, non-volatile storage 120, display controller subsystem 124 and other subsystems. The display controller subsystem 124 interacts with display 126 and it renders graphics and/or text upon the display 126. For example, a Graphical User Interface (GUI) may be rendered upon the display 126.

Still with reference to the computer terminal 104 of the computer system 100, operating system 140 and various software applications used by the processor 112 are stored in the non-volatile storage 120. The non-volatile storage 120 is, for example, one or more hard disks, solid state drives, or some other suitable form of computer readable medium that retains recorded information after the computer terminal 104 is turned off. Regarding the operating system 140, this includes software that manages computer hardware and software resources of the computer terminal 104 and provides common services for computer programs. Also, those skilled in the art will appreciate that the operating system 140, legacy software application 143, and other applications 152, or parts thereof, may be temporarily loaded into a volatile store such as the RAM 116. The processor 112, in addition to its operating system functions, can enable execution of the various software applications on the computer terminal 104.

Regarding the above-mentioned legacy software application 143 stored within the computer terminal 104, in some examples this may be a software application that has seen its customer base grow to a large size over a number of years of software sales. In such examples, it will be understood that there may be a proportionally large customer hesitation, effort and risk concern to have that legacy software application replaced when the software vendor sets forth a proposal to do that in accordance with conventional software replacement approaches. This may lead to relationship stress between the customers and the software vendor because, for example, on the other side of the situation, customer delays and refusals in taking on updates can gradually cause, for instance, increased (and undesirable) fragmentation over time in software versions amongst the installed customer base (e.g. group of active customers). As will become more apparent from further description of example embodiments which follow, impacts of example embodiments may be to make new features and new applications easier to release, and easier to retract (e.g. for reasons of defect or market failure). Also, new features and new applications may be more likely to be appreciated by customers with less resistance, by measurably reducing both effort and risk to the customer (for example, conventionally common actions like downloading and reinstalling an entire application just to acquire new features may be reduced or entirely eliminated).

Still with reference to FIG. 1, the server system 108 includes various software components for carrying out functions of the server system 108. These software components will vary depending on the particular implementation requirements defined for the server system 108. In some examples, the server system 108 includes one or more media server modules for managing and processing of video, audio and other media within the computer system 100. Other software components of the server system 108 might include, for example, special test and debugging software, software to facilitate version updating of modules within the server system 108, etc.

Continuing with FIG. 1, the illustrated network-addressable devices $103_1$ to $103_N$ are understood to be coupled to the server system 108. In some examples, one or more of the network-addressable devices $103_1$ to $103_N$ are coupled to the server system 108 via one or more suitable networks. These networks can include the Internet, or one or more other public/private networks coupled together by network switches or other communication elements. The network(s) could be of the form of, for example, client-server networks, peer-to-peer networks, etc. Data connections between any one or more the network-addressable devices $103_1$ to $103_N$ and the server system 108 can be any number of known arrangements, examples of which were previously herein detailed. In at least one example embodiment, the network-addressable devices $103_1$ to $103_N$ and the server system 108 are within the same Local Area Network (LAN).

Examples of the network-addressable devices $103_1$ to $103_N$ may include, for instance, network-addressable cameras, network-addressable appliances, network-addressable access controlling devices, Internet of Things (IoT) devices, etc. As will be understood by those skilled in the art, heterogeneous mixtures of these network-addressable devices is contemplated. In some examples, bidirectional communication between each of the network-addressable devices $103_1$ to $103_N$ and the computer terminal 104 is established and maintained via the server system 108 that is coupled therebetween.

Figure 2:
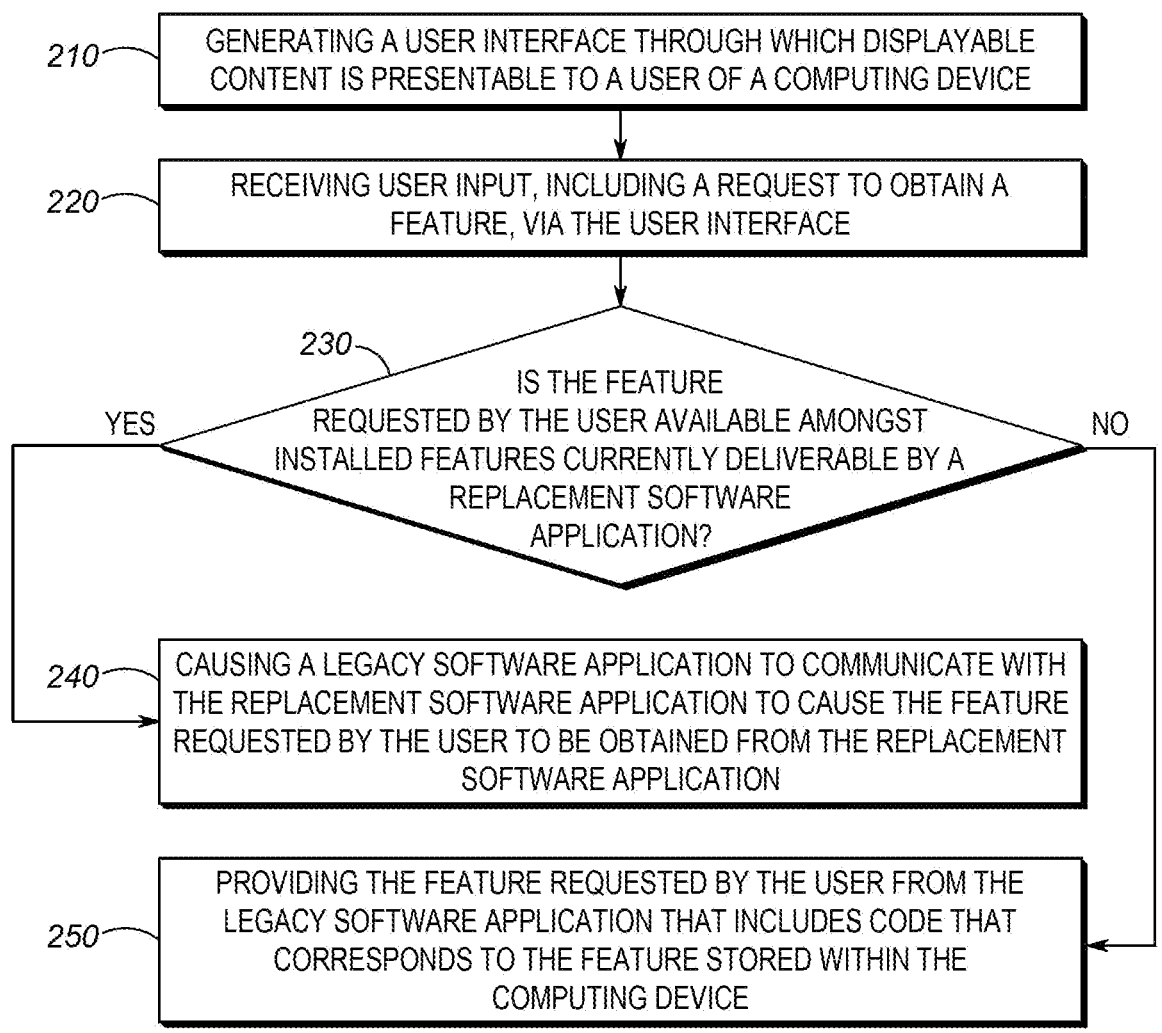
FIG. 2 is a flow chart illustrating a method in accordance with an example embodiment.

Reference is now made to FIG. 2. FIG. 2 is a flow chart illustrating a method 200 in accordance with an example embodiment.

Referring to FIG. 2, the illustrated method 200, which in some examples is carried out within the computer system 100, includes generating (210) a user interface through which displayable content is presentable to a user of the computing device. For example, a user of the computing device 104 (FIG. 1) may be presented the displayable content via the display 126. In at least some examples, a GUI delivered via network communication within the computer system 100 may be configured to carry out logical processing within the computing device 104.

Next the method 200 includes receiving user input (220) via the user interface. The user input (which may be provided by user operation of, for example, one or more of the input devices 114) includes a request to obtain a feature provided at least in part by software.

Next the method 200 includes decision action 230, which is determining whether or not the feature requested by the user is available amongst installed features currently deliverable by a replacement software application (for example, the replacement application 145, which although shown in FIG. 1 as one application for convenience of illustration, may alternatively be any suitable number of replacements applications, each constituting one of a plurality of partially replacing features sets which, when all collectively installed within the computer system 100, will eventually entirely replace the legacy application 143).

Continuing on, if "YES" follows from the decision action 230, i.e. the feature requested by the user is currently deliverable by the replacement software application, then next in the method 200 is causing (240) a legacy software application (for example, the legacy software application 143) to communicate with the replacement software application to cause the feature requested by the user to be obtained from the replacement software application.

Alternatively, if "NO" follows from the decision action 230, i.e. the feature requested by the user is not currently deliverable by the replacement software application, then next in the method 200 is providing (250) the feature requested by the user from the legacy software application that includes code that corresponds to the feature stored within the computing device.

Figure 3:
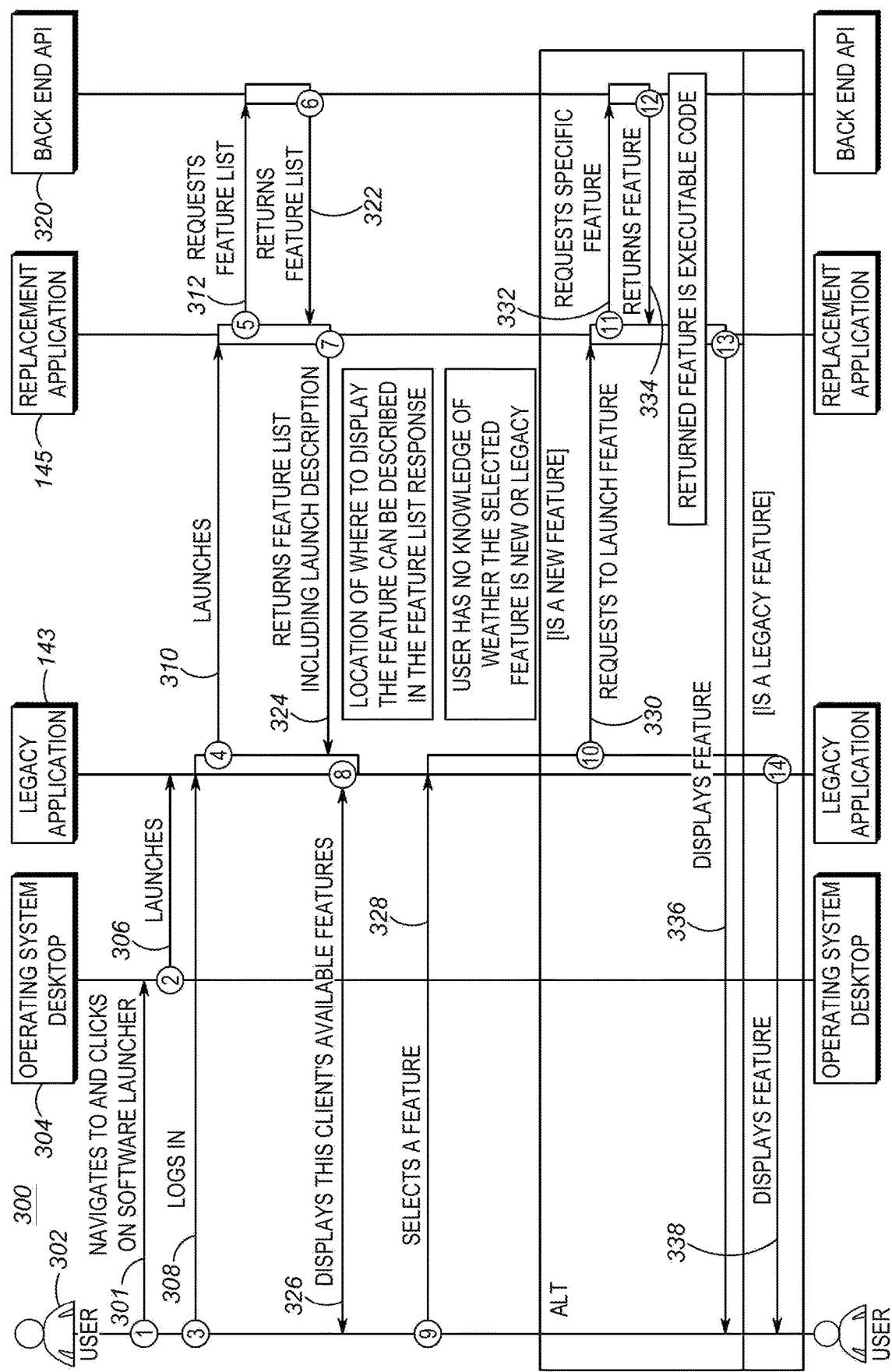
FIG. 3 is a sequence diagram, relating to a first stage of two deprecation stages, and providing additional example technical details that relate the method of FIG. 2.

Reference is now made to FIG. 3. FIG. 3 is a sequence diagram 300, relating to a first stage (partial deprecation stage) of two deprecation stages, and providing additional example technical details that relate to the method 200 of FIG. 2.

In the sequence diagram 300, arrow 301 represents a user 302 navigating to and clicking on a software launcher that forms a part of operating system desktop 304 (in at least one example, the operating system desktop 304 may be a module of the operating system 140 of FIG. 1).

Next in the sequence diagram 300, arrow 306 represents communication between the operating system desktop 304 and the legacy application 143 to effect launching of the legacy application 143.

Next in the sequence diagram 300, and following the legacy application 143 being launched, arrow 308 represents the user 302 logging in (for example, inputting login credentials) to the legacy application 143.

Next in the sequence diagram 300, and following a successful login by the user 302, arrow 310 represents communication between the legacy application 143 and the replacement application 145 to effect launching of the replacement application 145.

Next in the sequence diagram 300, and following the replacement application 145 being launched, arrow 312 represents a request sent to back end Application Programming Interface (API) 320 from the replacement application 145 for a feature list. Arrow 322 then follows the arrow 312, which represents the back end API 320 returning the feature list to the replacement application 145.

Next in the sequence diagram 300, arrow 324 represents a communication from the replacement application 145 to the legacy application 143 (the communication being a returned feature list including a launch description). Also, it will be understood that a location of where to display the feature can be described in the feature list response.

Next in the sequence diagram 300, arrow 326 represents action by the legacy application 143. In particular, the legacy application 143 displays, within the User Interface (UI), the client's available features to the user 302. Arrow 328 then follows the arrow 326, which represents the user 302 selecting a feature to be displayed (i.e. this is user input communicated to the legacy application 143).

Next in the sequence diagram 300, arrow 330 follows when the requested feature is obtainable from the replacement software application 145 (if the requested feature is not obtainable, then it is instead arrow 338 that follows). The arrow 330 represents a request communicated to the replacement application 145 from the legacy application 143 to launch the user selected feature.

Next in the sequence diagram 300, arrow 332 represents a request that is sent to the back end API 320 from the replacement application 145 for the specific feature that was selected by the user. Arrow 334 then follows the arrow 332, which represents the back end API 320 returning the requested feature to the replacement application 145 as executable code.

Next in the sequence diagram 300, arrow 336 represents action by the replacement application 145. In particular, the replacement application 145 displays the requested feature to the user 302.

As mentioned before, the arrow 338 follows from the arrow 330 when the requested feature is not obtainable from the replacement software application 145. In such a case, the requested feature is obtained from the legacy application 143, and the arrow 338 represents action by the legacy application 143. In particular, the legacy application 143 displays the requested feature to the user 302.

Figure 4:
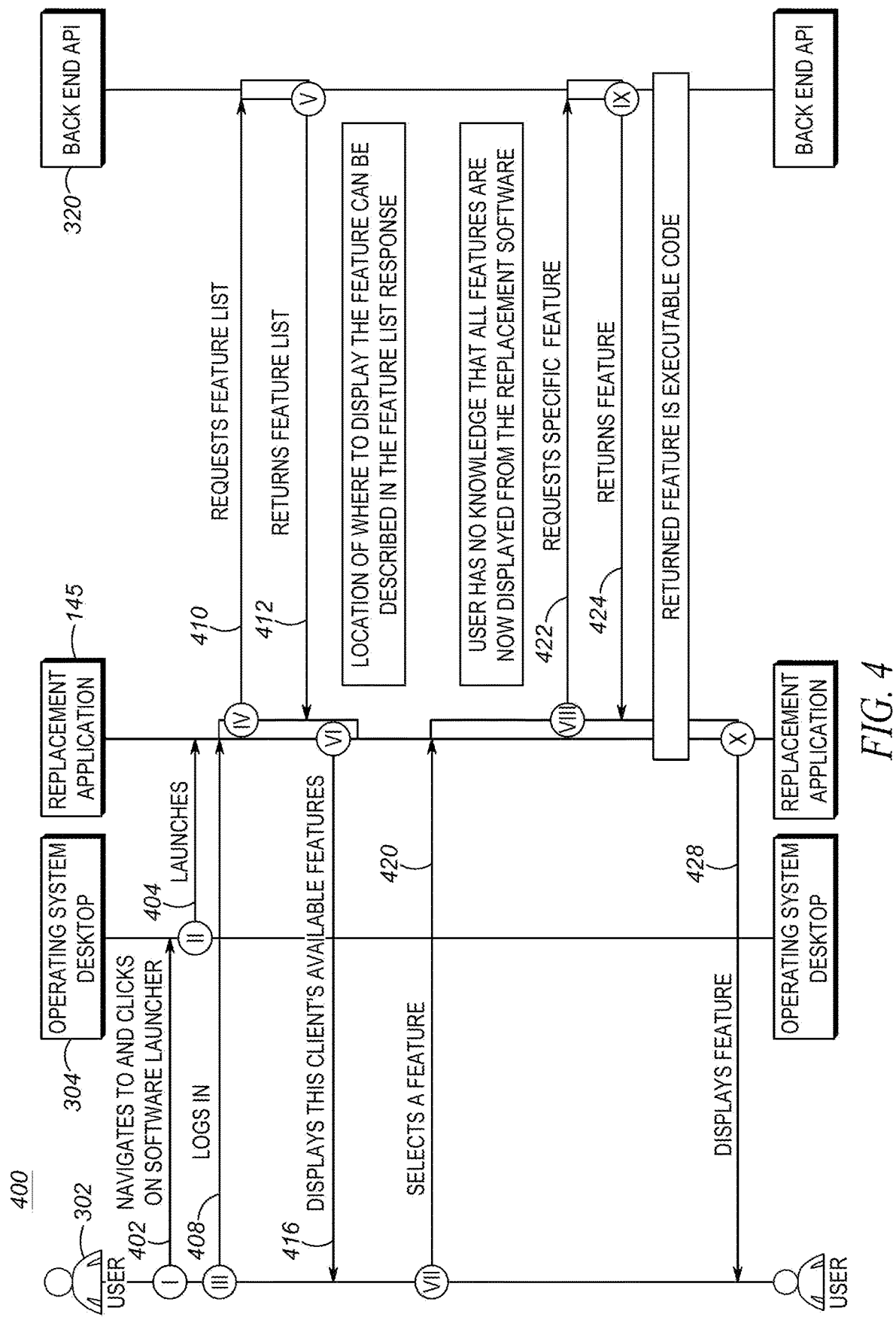
FIG. 4 is another sequence diagram relating to a second stage of the two deprecation stages herein described.

Reference is now made to FIG. 4. FIG. 4 is a sequence diagram 400, relating to a second stage (full deprecation stage) of the two deprecation stages, and providing additional example technical details that relate the method 200 of FIG. 2. Since the sequence diagram 400 is corresponding to the stage of full deprecation, the legacy application 143 is not shown at all in FIG. 4.

In the sequence diagram 400, arrow 402 represents a user 302 navigating to and clicking on a software launcher that forms a part of operating system desktop 304 (in at least one example, the operating system desktop 304 may be a module of the operating system 140 of FIG. 1).

Next in the sequence diagram 400, arrow 404 represents communication between the operating system desktop 304 and the replacement application 145 to effect launching of the replacement application 145.

Next in the sequence diagram 400, and following the replacement application 145 being launched, arrow 408 represents the user 302 logging in (for example, inputting login credentials) to the replacement application 145.

Next in the sequence diagram 400, arrow 410 represents a request sent to the back end API 320 from the replacement application 145 for a feature list. Arrow 412 then follows the arrow 310, which represents the back end API 320 returning the feature list to the replacement application 145. Also, it will be understood that a location of where to display the feature can be described in the feature list response.

Next in the sequence diagram 400, arrow 416 represents action by the replacement application 145. In particular, the replacement application 145 displays, within the User Interface (UI), the client's available features to the user 302. Arrow 420 then follows the arrow 416, which represents the user 302 selecting a feature to be displayed (i.e. this is user input communicated to the legacy application 143).

Next in the sequence diagram 400, arrow 422 represents a request that is sent to the back end API 320 from the replacement application 145 for the specific feature that was selected by the user. Arrow 424 then follows the arrow 422, which represents the back end API 320 returning the requested feature to the replacement application 145 as executable code.

Next in the sequence diagram 400, arrow 428 represents action by the replacement application 145. In particular, the replacement application 145 displays the requested feature to the user 302.

In accordance with at least one example embodiment, it is contemplated that a software customer may be able to only have to accept a single (one time) software update to the customer's legacy software application (this single software update having the purpose of updating the legacy software application to obtain needed control to launch and close one or more replacement software applications). Subsequent to this single software update, next updates may be made invisible to the user. Furthermore, it is also optionally possible for the following to be made invisible to the user: reduction of the usage and visibility of the legacy software application over time, and removal of the legacy application from the computing device once the full deprecation stage is reached.

As should be apparent from this detailed description, the operations and functions of the electronic computing device are sufficiently complex as to require their implementation on a computer system, and cannot be performed (or at least adequately performed), as a practical matter, by mere human effort (e.g. human mental effort). Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etcetera, and cannot process a digital request that a feature, provided at least in part by execution of software, be obtained, among other features and functions set forth herein).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending on the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate element or device via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer system comprising:
   a display;
   at least one non-volatile computer readable medium storing a legacy software application and a replacement software application, wherein each of the legacy and replacement software applications are independently operable, and
   the legacy software application being configured to communicate with the replacement software application, and the legacy software application including:
      a user interface layer configured to generate displayable content presented to a user of the computer system on the display following the legacy software application being launched; and
      a feature selector module configured to cause a user requested feature to be obtained from the replacement software application when included therein, and when the user requested feature is not included in the replacement software application instead provide the user requested feature, as a displayed feature on the display, from the legacy software application via the user interface layer of the legacy software application,
   wherein the replacement software application includes another user interface layer, and defined boundaries between the another user interface layer and the user interface layer of the legacy software application are invisible to the user.

2. The computer system of claim 1 wherein the non-volatile computer readable medium is further storing an updateable list of a plurality of features that the replacement software application is configured to provide, and the feature selector module is further configured to check the list to determine whether or not user requested feature is or is not included in the replacement software application.

3. The computer system of claim 1 wherein the computer system includes a computing device that includes a device housing containing the non-volatile computer readable medium.

4. The computer system of claim 1 wherein the replacement software application obtains the user requested feature via a call to an Application Programming Interface (API).

5. The computer system of claim 4 wherein the API returns the user requested feature to the replacement software application as executable code.

6. A computer system comprising:
a display;
at least one non-volatile computer readable medium storing a legacy software application and a replacement software application, wherein each of the legacy and replacement software applications are independently operable, and
the legacy software application being configured to communicate with the replacement software application, and the legacy software application including:
a user interface layer configured to generate displayable content presented to a user of the computer system on the display following the legacy software application being lauched; and
a feature selector module configured to cause a user requested feature to be obtained from the replacement software application when included therein, and when the user requested feature is not included in the replacement software application instead provide the user requested feature, as a displayed feature on the display, from the legacy software application via the user interface layer of the legacy software application,
wherein the non-volatile computer readable medium can be made to store one or more another replacement software applications which are also independently operable and complementary to the replacement software application, and the feature selector module is further configured to cause first user requested features and second user requested features, different than the first user requested features, to be obtained from the replacement software application and the one or more another replacement software applications respectively.

7. The computer system of claim 6 wherein the non-volatile computer readable medium is further storing an updateable list of a plurality of features that the replacement software application is configured to provide, and the feature selector module is further configured to check the list to determine whether or not user requested feature is or is not included in the replacement software application.

8. The computer system of claim 6 wherein the computer system includes a computing device that includes a device housing containing the non-volatile computer readable medium.

9. The computer system of claim 6 wherein the replacement software application obtains the user requested feature via a call to an Application Programming Interface (API).

10. The computer system of claim 9 wherein the API returns the user requested feature to the replacement software application as executable code.

11. The computer system of claim 6 wherein the replacement software application includes another user interface layer, and defined boundaries between the another user interface layer and the user interface layer of the legacy software application are invisible to the user.

12. A computer system comprising:
a display;
at least one non-volatile computer readable medium storing a legacy software application and a replacement software application, wherein each of the legacy and replacement software applications are independently operable, and
the legacy software application being configured to communicate with the replacement software application, and the legacy software application including:
a user interface layer configured to generate displayable content presented to a user of the computer system on the display following the legacy software application being launched; and
a feature selector module configured to cause a user requested feature to be obtained from the replacement software application when included therein, and when the user requested feature is not included in the replacement software application instead provide the user requested feature, as a displayed feature on the display, from the legacy software application via the user interface layer of the legacy software application,
wherein the legacy software application is further configured to self-disable based on a features availability condition corresponding to the replacement software application.

13. The computer system of claim 12 wherein an application launch and entry user experience delivered by the computer system is unchanged following the legacy software application becoming self-disabled.

14. The computer system of claim 12 wherein the non-volatile computer readable medium is further storing an updateable list of a plurality of features that the replacement software application is configured to provide, and the feature selector module is further configured to check the list to determine whether or not user requested feature is or is not included in the replacement software application.

15. The computer system of claim 12 wherein the computer system includes a computing device that includes a device housing containing the non-volatile computer readable medium.

16. The computer system of claim 12 wherein the replacement software application obtains the user requested feature via a call to an Application Programming Interface (API).

17. The computer system of claim 16 wherein the API returns the user requested feature to the replacement software application as executable code.

18. The computer system of claim 12 wherein the replacement software application includes another user interface layer, and defined boundaries between the another user interface layer and the user interface layer of the legacy software application are invisible to the user.

* * * * *